March 15, 1960  E. J. ROZANSKI  2,928,151
FACE CAP
Filed March 7, 1956
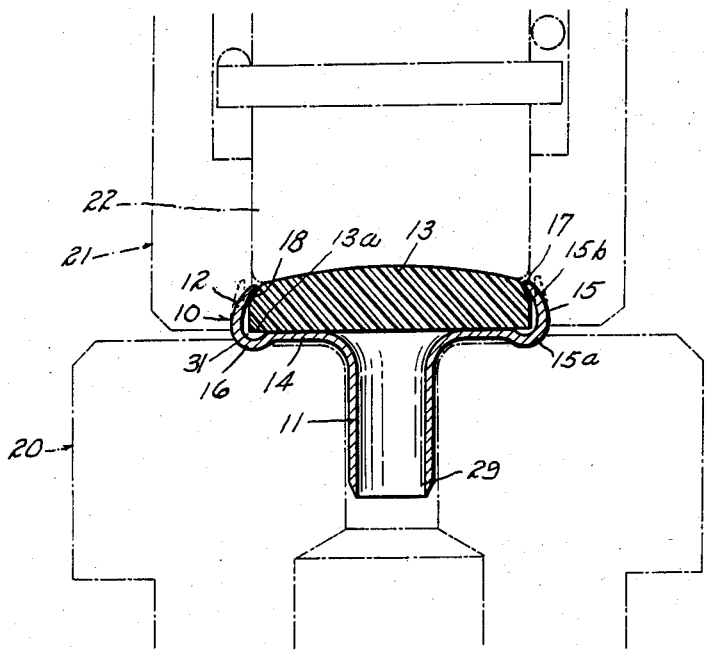
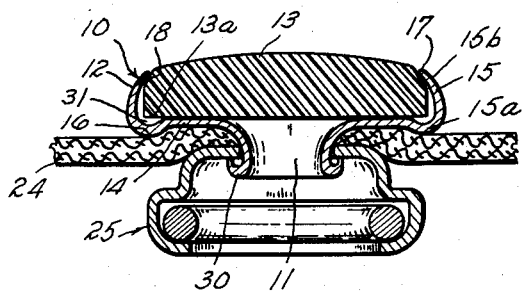
FIG. 2
FIG. 3
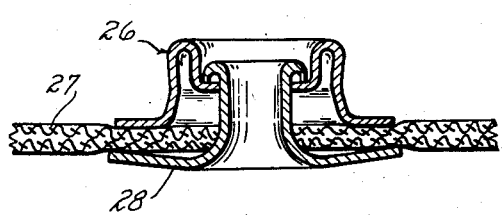
INVENTOR.
EDWARD J. ROZANSKI
BY
Lindsey and Prutzman
ATTORNEYS

United States Patent Office 2,928,151
Patented Mar. 15, 1960

2,928,151

FACE CAP

Edward J. Rozanski, Oakville, Conn., assignor to The Patent Button Company, Waterbury, Conn., a corporation of Connecticut Application March 7, 1956, Serial No. 569,986

3 Claims. (Cl. 24—90)

This invention relates to snap fasteners, and more particularly to a one-piece face cap having a novel construction for retaining an insert, such as a plastic insert, thereon.

It is sometimes desirable to provide a snap fastener face cap having a decorative insert fabricated from the groups of material commonly referred to as plastics. One of the most common methods for retaining an insert on a face cap is to employ a ring of metal, such as a bezel, about the periphery of the insert and face cap to clamp the cap and insert together between portions of the bezel. When the cap and insert is later assembled with a socket or stud with a thickness of material such as cloth therebetween, it is usually necessary to apply pressure to the socket or stud and to the portion of the bezel engaging the insert in order to compress the cloth and connect the cap to the stud or socket. The assembly pressure necessary for this operation varies more or less proportionately to the thickness of cloth used, and where the cloth is relatively thick, it often occurs that the insert is fractured by the crushing force imposed thereon. This latter problem has heretofore impeded the use of face caps with plastic inserts for a snap fastener assembly where the material on which the fastener is to be mounted is comprised, for example, of four or five thicknesses of heavy material such as used in dungarees and also has resulted in undesirably frequent repeat assembly operations even where relatively light material is used due to the inadvertent application of assembly pressures higher than is necessary.

It is therefore the object of this invention to provide a face cap having a novel and improved means for retaining a non-metallic insert thereon whereby fracture of the insert is effectively prevented during assembly of the face cap and insert or during assembly of the face cap with insert with a snap fastener socket or stud.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 1 is a cross sectional view of a face cap embodying this invention with a plastic insert assembled therewith; and Fig. 2 is a cross sectional view of the face cap of Fig. 1 assembled with a typical socket with material therebetween;

Fig. 3 is a cross sectional view of a typical mating stud assembly for use with the face cap and socket assembly of Fig. 2.

With reference to the drawings, a snap fastener face cap constructed in accordance with this invention is generally indicated at 10, and is comprised of a cylindrical shank 11 and a cup-like head portion 12 in which is received an insert 13, fabricated from brittle non-metallic material commonly known as "plastic." In accordance with the invention, the head portion 12 is comprised of a flat base or shoulder portion 14 on which the insert is mounted. The base extends radially of the shank 11 at one end thereof and a peripheral retaining ring 15 preferably integral with the base extends from the periphery thereof. As can be seen from the drawings, the retaining ring 15 when assembled with an insert has a generally C shaped radial cross section wherein one leg 15a of the retaining ring is curved downwardly and outwardly of the base 14 and other leg 15b is curved upwardly and inwardly thereof. This C shaped cross section of the retaining ring forms an annular concave or bight portion 16 depending from the base about the outer periphery thereof and spaced from the insert 13 whereby a narrow lip portion of bottom 13a of the insert extends beyond or overhangs the base 14 and is unsupported thereby. The leg 15b of the retaining ring is tapered toward its free end 17, a portion of which is clampingly engaged with the insert 13 to retain the insert within the head portion.

In accordance with the invention, and for reasons which will be hereinafter apparent, the peripheral surface 18 of the insert which is engaged by the leg 15b of the retaining ring is inclined or tapered upwardly and inwardly of the insert at an included angle of less than 90 degrees.

There is shown in Fig. 1, in phantom outline, a typical means for assembling the insert 13 within the head 12. A die in which the face cap is inserted is generally indicate at 20 and a pressure piston is indicated at 21 having an internal coaxially disposed back-up piston 22. The die 20 is provided with a concave recess receiving and supporting the bight portion 16 of the face cap, and as is apparent the remainder of the face cap is spaced from the die to assure that any force between the die and face cap will be transmitted only through the bight portion 16. As can be seen in Fig. 1 the cross section of the retaining ring 15 is J shaped (as shown in the dotted line portion) prior to assembly with an insert and the pressure piston 21 is suitably formed to engage the outer surface of the leg 15b adjacent the free end thereof to move this portion of the ring from the dotted line position to the solid line position wherein the insert 13 will be clampingly engaged by the free end portion of leg 15b. The material from which the face cap is fabricated is of course preferably ductile to permit permanent deformation of the leg 15b into clamping engagement with the insert. The taper in the leg 15b, hereinbefore referred to, effectively reduces the cross section of the leg 15b in the area thereof which is clamped over the insert thus reducing the amount of assembly pressure necessary. The cross sectional thickness of the bight portion 16 however is sufficient to withstand the high forces imposed thereon in assembly of the face cap with a socket, as will be hereinafter more fully explained.

Inasmuch as the application of assembly force, as described above, is on the free end portion of the leg 15b and on the bight portion 16 and inasmuch as the portion of the insert directly below the point of force on the leg 15b is not supported by the base 14, there is no tendency for the insert to be crushed between the leg 15b and the base. The provision of the inclined surface 18 on the insert assures that the forces imposed thereon by the leg 15b will be directed for the most part radially of the insert and further that if an excessive force is used the free end 17 of the leg 15b will be displaced downwardly along the surface 18, thus effectively reducing the bending stress on the unsupported portion of the insert.

With reference to Fig. 2, the face cap 10 is shown in assembled condition with a conventional socket assembly 25 of well-known construction and with a thickness of material 24 such as cloth disposed between the socket assembly and the base of the face cap. It is of course understood that the face cap might be assembled with a stud such as shown at 26 in Fig. 3 rather than with a socket assembly 25. The stud 26 is shown in Fig. 3 merely for illustration purposes, mounted to a thickness of material 27 in a well-known manner by means such as the eyelet 28.

The assembly of the face cap 10 with the socket assembly 25 is accomplished in a manner much similar to the die and piston arrangement shown in phantom outline in Fig. 1 whereby the free end 29 of the shank is crimped over a portion of the socket assembly as at 30 with the material 24 interposed between the face cap and socket. During this assembly operation, and particularly wherein a relatively thick layer of material or a plurality of thinner layers of material are used, it is often necessary to utilize a relatively large force to assemble the elements. As an example, in certain applications it has been found that such assembly forces can be as high as 1200 pounds. With previously developed face caps having plastic inserts, as explained above, it has been practically impossible to utilize such a high force without crushing the insert. However, with a face cap constructed in accordance with this invention wherein the insert is not subjected to a direct crushing force, as was explained above in connection with the assembly of the insert within the face cap, it is possible to utilize assembly forces at least as high as 1200 pounds without fracture of the insert.

It is to be noted that the annular bight portion 16 formed in accordance with the invention about the outer periphery of the base 14 serves an important purpose during assembly of the face cap and socket other than as mentioned above. During the assembly of the face cap and socket, it has been found that when the end 29 of the shank is turned over as at 30, the base 14 where it joints the shank tends to buckle towards the insert, thus resulting in the portion of the base 14 adjacent the retaining ring 12 moving downwardly or away relative to the insert. The provision of the annular bight portion 16 serves to strengthen the base and preclude or at least minimize this undesirable deformation thereof. It is of course obvious that the provision of the bight portion 16 is equally applicable to and advantageous when used with face caps not having the novel means of insert retention present herein.

Even if it should happen that the base does deform slightly as described, the provision of the inclined surface 18 of the insert will permit the leg 15b of the retaining ring to move downwardly therealong with the result that the leg 15b will be flexed slightly outwardly. The resiliency of the retaining ring will, of course, cause the retaining ring to remain in firm clamping engagement with the insert in its new position.

It is also to be noted that with a face cap constructed in accordance with this invention the disposition of the bight portion 16 of the face cap results in effectively forming a recess, as at 31, in the base 14 which serves to reduce the amount of compression of the material 24 which is necessary to properly assembly the face cap and socket and permits the material 24 to flow freely without causing an unsightly bunching.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. A face cap of the type that is forced through material into holding engagement with a socket comprising a unitary body and flat bottomed insert retained therein, said unitary body having a depending shank adapted to be driven through the material to engage the socket and a flat integral shoulder extending radially outwardly from said shank and engaging the bottom of said insert to form a bearing surface therefor, said shoulder having a narrow peripheral groove formed therein at its outer edge and facing toward the flat bottom of said insert thereby to provide a narrow unsupported peripheral insert edge, said insert having an inwardly beveled upper edge in vertical alignment with the unsupported peripheral bottom edge, and an inwardly directed arcuate retaining portion integral with and extending upwardly from the outer edge of said peripheral groove and having its upper end reduced in cross section to define a tapered end in engagement with the beveled upper edge of said shoulder, said tapered end being in vertical alignment with the peripheral groove in said shoulder.

2. A face cap of the type that is forced through material into holding engagement with a socket comprising a unitary generally tubular body and a flat bottomed insert retained therein, said unitary body having a tubular depending shank adapted to be driven through the material to engage the socket, and a flat integral shoulder extending radially outwardly from said depending fastening portion and engaging the bottom of said insert to form a bearing surface therefor, said shoulder having a narrow peripheral groove formed therein at its outer edge and facing towards the flat bottom of said insert thereby to provide a narrow unsupported peripheral insert edge, said insert having an inwardly beveled upper edge in vertical alignment with the unsupported peripheral bottom edge, and an inwardly directed arcuate retaining ring integral with and extending upwardly from the outer edge of said peripheral groove and having its upper end reduced in cross section to define a tapered end in engagement with the beveled upper edge of said insert, the mutually engaged portions of said tapered end and said insert being in vertical alignment with the peripheral groove in said shoulder.

3. A face cap of the type that is forced through material into holding engagement with a socket comprising a unitary generally tubular body and a flat bottomed insert retained therein, said unitary body having a tubular shank adapted to be driven through the material to engage the socket and a flat integral shoulder extending radially outwardly from the end of said shank, a narrow peripheral groove formed in said shoulder at its outer edge and facing towards the flat bottom of said insert, said shoulder engaging the bottom of said insert from the inner edge of said peripheral groove to the outer edge of the shank thereby to provide a narrow unsupported peripheral insert edge, said insert having an inwardly beveled upper edge in vertical alignment with the unsupported peripheral bottom edge, and an inwardly directed arcuate retaining ring integral with and extending upwardly from the outer edge of said peripheral groove and having its upper end reduced in cross section to define a tapered end in engagement with the beveled upper edge of said insert, said tapered end being in vertical alignment with the peripheral groove in said shoulder.

References Cited in the file of this patent

UNITED STATES PATENTS

| | | |
|---|---|---|
| 1,471,809 | Schmid | Oct. 23, 1923 |
| 1,592,663 | Hallihan | July 13, 1926 |